Jan. 17, 1967 L. ROTH 3,298,197
READILY DISENGAGEABLE COUPLING
Filed Sept. 29, 1964
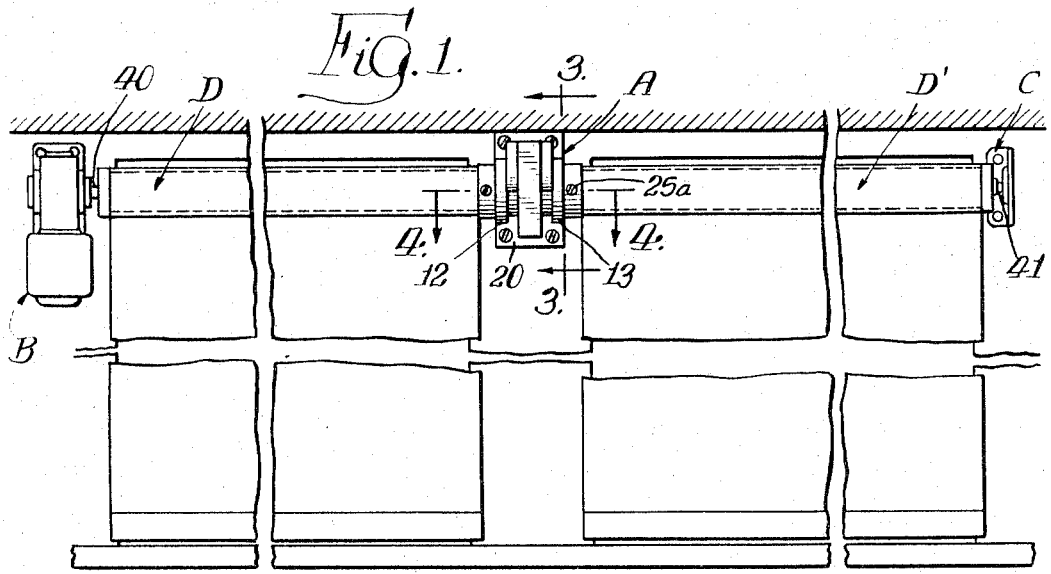
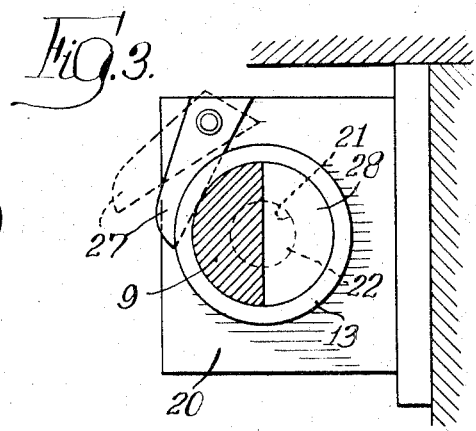
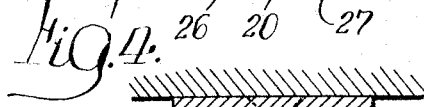
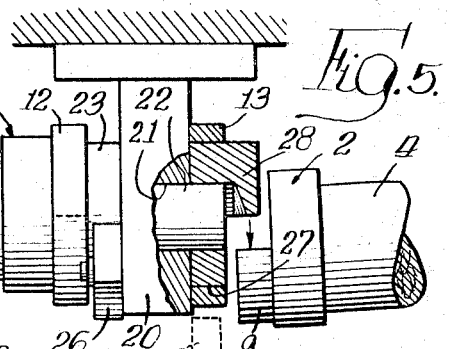
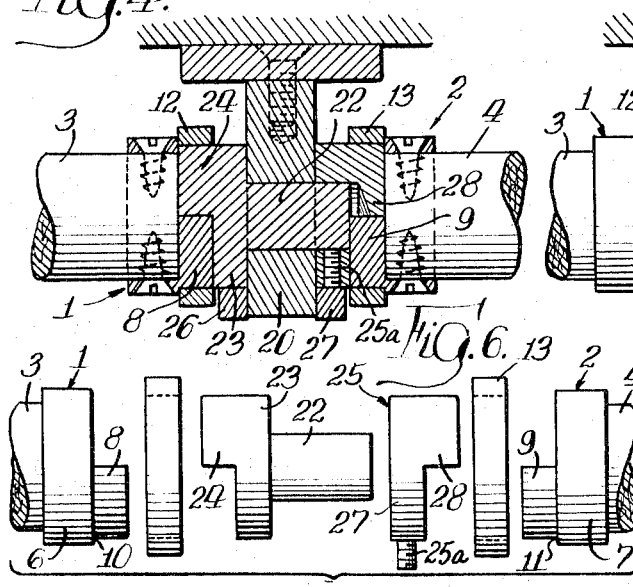
Inventor
Leo Roth,
By Hofgren, Wegner, Allen
Stellman & McCord
Attys.

United States Patent Office 3,298,197
Patented Jan. 17, 1967

3,298,197
READILY DISENGAGEABLE COUPLING
Leo Roth, 11950 S. 71st Ave., Palos Heights, Ill. 60463
Filed Sept. 29, 1964, Ser. No. 399,969
1 Claim. (Cl. 64—1)

This invention relates to a readily disengageable coupling and, more particularly, to a coupling that can be efficiently used with a mechanized roller type window shade.

It is the general object of this invention to produce a new and improved coupling which facilitates ease of removal of appropriate rollers of a roller type window shade.

A further object of the invention is to provide a coupling which is sturdy enough for use in a mechanized rotation of appropriate roller members, yet one which is readily disengageable and adapted for household, office or similar usage.

Another object of this invention is to provide a readily disengageable coupling which can be used in a series of rollers, said rollers being rotated mechanically by a means which may be positioned at a remote end of said series of rollers.

As will become apparent, this coupling is not limited to use with respect to a mechanized roller type window shade. Any variety of functions may conceivably be served by such an easily disengageable coupling. This will become obvious from the following description and drawings in which:

FIGURE 1 is a front elevation view showing one embodiment of the present invention;

FIGURE 2 is a top plan view of the coupling in its locked, mechanically operative engagement;

FIGURE 3 is a vertical sectional view taken along line 3—3 of FIGURE 1;

FIGURE 4 is a horizontal sectional view taken along line 4—4 of FIGURE 1;

FIGURE 5 is a top plan view including a partial section showing the slidable ring in its unlocked position;

FIGURE 6 shows the principal disengageable members of the coupling.

Referring now to the drawings, FIGURE 1 shows a coupling A and an appropriate mechanical drive B. It should be noted that a second (third, etc.) coupling could be placed at C in a series of appropriate rollers D.

FIGURE 6 shows roller-connecting means 1 and 2 for joining appropriate rollers 3 and 4 to the coupling. These unitary disengageable parts of the coupling provide for cylindrical members 6 and 7 which have inside diameters to match the diameters of rollers 3 and 4. Said rollers may therefore be permanently connected to these integral parts of the coupling by simply inserting the rollers into the cylinders and retaining them by appropriate means. The roller-connecting means 1 and 2 are provided with semicircular engaging lugs 8 and 9 having smaller diameters than the adjacent cylindrical members 6 and 7, thus creating semicircular shoulders 10 and 11 around the end periphery of said cylindrical members. The shoulders prevent retaining means taking the form of rings 12 and 13 (to be described later) from moving away from their locked mechanically operative position as shown in FIGURES 2 and 4.

A bracket 20 is adapted to be mounted on a wall or other support between two rollers such as shown in FIGURE 1, and the bracket is provided with an internal bore 21 for rotatably supporting the coupling member of the present invention. For this purpose there is provided a shaft 22 rotatably receivable in the bore 21 with the shaft carrying at its left-hand end (as seen in FIGURE 6) a cylindrical enlargement 23 terminating in a semicircular engaging lug 24. A second member 25 corresponding in shape to the portions 23 and 24 at the left-hand end of shaft 22 is adapted to be secured to the right-hand end of shaft 22 by means of the screw device 25a. Thus, the member 25 is provided with a cylindrical outer surface 27 and an engaging lug 28.

The outer surfaces of the portions 23 and 27 are of the same diameter as the outer surfaces of the lugs 8 and 9 and when the parts are engaged as shown in FIGURE 4 so that the engaging lug 24 engages the lug 8, and the engaging lug 28 engages the lug 9, the parts may be held in such engaging driving relationship by sliding the rings 12 and 13 axially outwardly of the bracket 20 to the position shown in FIGURES 2 and 4 abutting the shoulders 10 and 11.

The rings 12 and 13 have inner annular surfaces which have the same diameters as the annular surfaces of the complementary lugs 24–8 and 28–9. Said rings retain the abutting lugs in an engaged rotatable position by encircling their outer periphery. Said rings are prevented from axially sliding outward along the rollers and away from their locked position by the shoulders 10 and 11. Said rings are retained in their locked position (shown in FIGURE 2) by pivot fingers 26 and 27 mounted on the sides of brace 20. Said fingers pivot normal to the rotating axis of the coupling. Thus the pivot fingers may be rotated normally away from said axis and allow the rings to slide inward toward the fixed brace and, in effect, disengage the matching lugs 24–8 and 28–9. The disengagement of said lugs enables the ready removal of appropriate rollers.

The means for mounting said coupling to a fixed support could conceivably embody a variety of forms. The present invention consists of a generally T shaped brace 20, having the bridge of the T fastened to a fixed support. The leg of said T brace protrudes from the fixed support and rotatably secures shaft 22 therein, by means of a circular bore 21 therethrough.

It should be noted that this invention is designed primarily for use in a window shade grouping in a series, by providing for two rings 12 and 13, two pivot fingers 26 and 27 on opposite sides of brace 20, and two lugs 24 and 28 at each end of the coupling member. A variety of single as well as said dual embodiments are obviously contemplated.

In utilizing the coupling of the present invention with the portions A, B and C mounted as shown in FIGURE 1, a shaft 40 extending from one end of the roller D is engaged with the mechanical drive B, and the other end of the roller is positioned so as to engage its lugs with those provided on the coupling member and the ring 12 is then moved axially outwardly of the bracket to hold the same in engaged position with the finger 26 retaining the ring in such position. The shaft 41 of the roller D' is then inserted into a suitable opening in a support member C for rotatably supporting the right-hand end of the roller D', and the lug provided at the left-hand end of the roller D' is engaged with the lug 28 as shown and retained in position by moving the ring 13 axially outwardly of the bracket 20 and allowing the finger 27 to retain it in such position.

It thus can be seen that I have provided a simple driving coupling which not only provides a positive drive from one rotatably mounted member such as the roller D to a second rotatably mounted member such as D', but also provides a simple means of mounting and demounting the rollers for installation, repair, and the like.

I claim:

A readily disengageable coupling, comprising: a coupling shaft, a brace rotatably supporting the coupling shaft, semicircular engaging means at the ends of said shaft; rotatably mounted members in the form of rollers, two roller-connecting means provided with cylindrical portions encircling and retaining the ends of the rollers therein, complementary semicircular engaging means at the end of said cylindrical portions having smaller diameters than the cylindrical members to provide annular shoulders, said engaging means when engaged forming an annular outer surface; retaining means having an inner annular surface of the same diameter as the outer annular surface of the engaged engaging means to encircle the engaged engaging means to retain them in engaged operative position, said retaining means being prevented from sliding away from said brace out of their operative positions by the annular shoulders of the roller-connecting means while permitting free movement of said retaining means toward said brace onto said coupling shaft; and fingers pivotally mounted on opposite sides of the supporting brace for locking the retaining means in retaining position, said fingers pivoted to rotate normal to the rotating axis of the coupling to restrict the axial movement of the retaining means.

References Cited by the Examiner
UNITED STATES PATENTS

| | | | |
|---|---|---|---|
| 1,684,919 | 9/1928 | Keyser | 64—6 X |
| 1,700,800 | 2/1929 | Keyser | 64—4 |
| 2,525,922 | 10/1950 | Mandl | 64—4 X |
| 2,630,341 | 3/1953 | Downey | 64—1 X |
| 2,650,460 | 9/1953 | Newhouse. | |
| 2,833,183 | 5/1958 | Zierden | 64—8 X |
| 2,861,436 | 11/1958 | Leutert | 64—6 X |

FRED C. MATTERN, JR., *Primary Examiner.*

HALL C. COE, *Examiner.*